Nov. 15, 1938.                H. VATTER                2,137,069
                       ELECTRIC DISCHARGE VESSEL
                         Filed Feb. 3, 1937
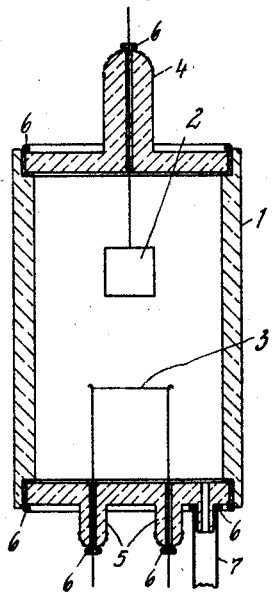
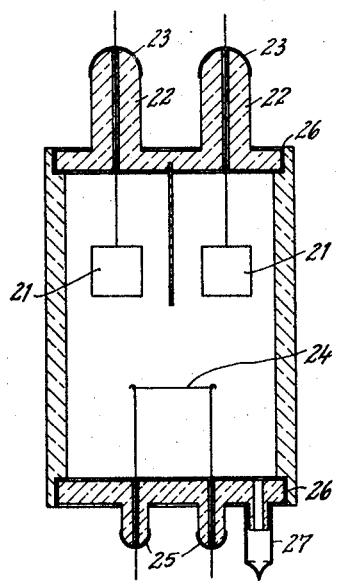
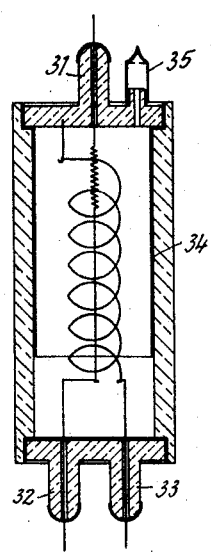
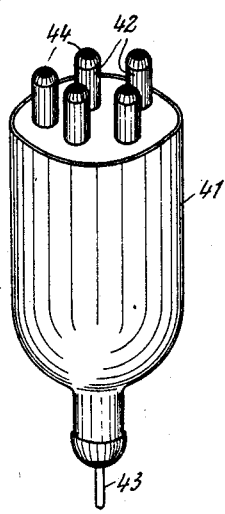
Inventor
Hans Vatter
by Knight Bros
         Attorneys Patented Nov. 15, 1938

2,137,069

UNITED STATES PATENT OFFICE 2,137,069

ELECTRIC DISCHARGE VESSEL

Hans Vatter, Berlin-Charlottenburg, Germany, assignor to Siemens & Halske, Aktiengesellschaft, Siemensstadt, near Berlin, Germany, a corporation of Germany Application February 3, 1937, Serial No. 123,741
In Germany February 4, 1936

2 Claims. (Cl. 250—27.5)

My invention relates to improvements in electric discharge vessels.

It is well known in the art to employ ceramic material for the walls of vacuum discharge devices. It has also been proposed to manufacture the walls of such devices separate from the parts through which the supply leads pass and exclusively of ceramic material. The supply leads are sealed in the ceramic walls of the vacuum discharge device with the aid of suitable kinds of glass. Such glass seals have, however, certain disadvantages, since from a mechanical and thermical point of view such seals present weak points.

It is also known in the art to solder in electric vacuum discharge vessels ceramic parts with one another or with metal by means of a soft solder. In this case, a ceramic base glaze is produced on the ceramic part to be soldered and a metallic glazing is then applied thereto. Precious metals, preferably platinum, are employed for the metallic glazing. This kind of soft soldering does not lend itself very well to the manufacture of electric discharge devices which must withstand the degassing temperature when being evacuated, since during this degassing process leakages occur owing to the use of a soft solder, the leakages being caused by the volatilization of easily volatile components of the soft solder. Also the ceramic base glazing does not in general withstand the heat developed during the degassing process.

My invention has for its object the elimination of the above difficulties heretofore experienced in electric discharge devices.

According to the invention the apertures in the walls of electric discharge vessels consisting exclusively of ceramic material, through which the electrodes or the like are introduced, are hermetically closed by applying a hard solder thereto without the need of any separate structural elements for sealing the apertures. The ceramic parts to be soldered must be metallized according to the invention by the use of a refractory base metal before effecting the soldering. To this end, iron powder has proved to be satisfactory. The iron powder is applied according to the invention in a finely divided state, for instance, suspended in alcohol, to the ceramic parts to be soldered by one of the known methods; for instance, by spreading or by spraying. By a heat treatment, preferably effected in a vacuum furnace, these metallic layers are then sintered together. It has been found that at a temperature lying between 1,260 and 1,270 degrees centigrade metallic layers are obtained which are capable of being accurately soldered. For simplifying the process and, therefore, for rendering the manufacture more economic, the sintering process may be carried out simultaneously with the soldering process. It is preferable to carry out both processes in an inert or neutral atmosphere, i. e. an atmosphere free of oxygen; for instance, nitrogen or hydrogen may be used.

In the accompanying drawing are shown some applications of my invention in diagrammatic form.

In Fig. 1 is shown a single-anode rectifier whose wall 1 is made of ceramic material. The supply leads to the anode 2 and the cathode 3 pass through narrow bores arranged in the ceramic parts 4 and 5 respectively. All ceramic points which are to be soldered are metallized according to the invention. The solder is applied to the points to be soldered in the form of a ring and is designated by the reference numeral 6. By the heat developed during the soldering process the solder becomes liquid and penetrates the metallized points, thus forming the desired vacuum-tight bond between the ceramic parts. At the same time the narrow bores in the ceramic parts 4 and 5 through which the leads pass are sealed during the soldering process. Finally, the vacuum-tight closure of the vessel is effected after evacuation by closing the metallic conduit 7.

In Fig. 2 is shown such a soldered and evacuated discharge vessel, representing a two-anode rectifier. The leads to the anodes 21 and the leads to the cathode 24 are sealed through the upper and lower ceramic part of the vessel by soldering as indicated at 23 and 25. The individual ceramic wall parts are soldered together as indicated at 26. The conduit 27 is sealed, for instance, by the use of silver, after evacuating the vessel. In electric discharge devices with liquid cathode it is preferable to provide this conduit with a constriction close to the lower end of the device as shown. In this manner a formation of amalgam by the mercury vapors is prevented with certainty.

Fig. 3 shows a three-electrode tube manufactured in the same manner as described in connection with Figs. 1 and 2. The leads to the cathode pass through the bores in the ceramic parts 31 and 32 and the lead to the grid through the bore arranged in the ceramic part 33. The anode 34 is formed of a metallic layer applied to the inner wall of the vessel. This metallic layer may also be made according to the invention at the same time when metallizing the other ceramic parts to be soldered. 35 denotes the pump conduit sealed after evacuation of the vessel.

Finally Fig. 4 shows a ceramic vacuum discharge vessel whose ceramic wall 41 is provided at its upper end with a plurality of terminals 42 and at the lower end with the terminal 43. In a vessel of this type a corresponding socket may easily be employed. To ensure a reliable contact it is preferable to solder onto the terminals small metallic discs 44. For this reason it may also be preferable to provide at the periphery of the terminals 42 particular contact elements which are united with the metallic discs 44 and which may also be united with the other ceramic part during the soldering process.

The method according to my invention lends itself particularly to mass production, since a number of electric discharge devices, depending upon the capacity of the furnace, may be simultaneously metallized and soldered. Since no particular metallic closing caps or the like are employed the care heretofore necessary for these devices in avoiding shrinkage is eliminated.

In the foregoing specification, as well as in the following claims, the term "ceramic material" is understood to refer to earthen substances of highly refractory nature, which have a sintered texture produced by forming and subsequent firing, in contrast to the lower melting glass which shows a thoroughly vitric structure resulting from a manufacture from a completely molten state.

I claim as my invention:

1. A vacuum tube, particularly an electric discharge tube comprising a tubular ceramic body, ceramic end plates closing the ends of said body, the adjacent parts of said body and said plates being coated with a layer of base metal directly deposited on and integrated with the ceramic surface of said body and said plates, a hard solder seal bonding the base metal layers of said body and said plates, electric conductors arranged on said plates so as to pass through apertures of said plates, the wall surface of each of said apertures being coated with a layer of base metal deposited directly on the ceramic wall surface, and a hermetic seal of hard solder bonding said conductor with said base metal coating on said wall surface.

2. With a vacuum tube, particularly an electric discharge tube, having an enclosure consisting exclusively of ceramic material and inleads passing through the wall of said enclosure, in combination a spatially limited coating of refractory base metal surrounding said inlead, said coating being disposed on and integrated with the ceramic surface of said wall, and a seal of hard solder hermetically bonding said inlead with said coating.

HANS VATTER.